(12) United States Patent
Saber et al.

(10) Patent No.: US 11,291,024 B2
(45) Date of Patent: Mar. 29, 2022

(54) SYSTEM AND METHOD FOR PHYSICAL DOWNLINK CONTROL CHANNEL MONITORING

(71) Applicant: Samsung Electronics Co., Ltd., Gyeonggi-do (KR)

(72) Inventors: Hamid Saber, San Diego, CA (US); Jung Hyun Bae, San Diego, CA (US)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 17/007,771

(22) Filed: Aug. 31, 2020

(65) Prior Publication Data

US 2021/0112572 A1 Apr. 15, 2021

Related U.S. Application Data

(60) Provisional application No. 62/914,924, filed on Oct. 14, 2019.

(51) Int. Cl.
*H04W 72/12* (2009.01)
*H04L 1/00* (2006.01)

(52) U.S. Cl.
CPC ....... *H04W 72/1242* (2013.01); *H04L 1/0038* (2013.01); *H04W 72/1289* (2013.01)

(58) Field of Classification Search
CPC ......... H04W 72/1242; H04W 72/1289; H04W 72/1247; H04L 1/0038; H04L 5/0053; H04L 5/0082; H04L 5/0064; H04B 17/30
See application file for complete search history.

(56) References Cited

U.S. PATENT DOCUMENTS

| | | | |
|---|---|---|---|
| 10,645,682 B2 | 5/2020 | Bhattad et al. | |
| 2019/0158205 A1* | 5/2019 | Sheng | H04L 5/0048 |
| 2019/0349142 A1 | 11/2019 | Aiba et al. | |
| 2019/0349911 A1 | 11/2019 | Seo et al. | |
| 2019/0363843 A1* | 11/2019 | Gordaychik | H04L 1/1854 |
| 2019/0386804 A1* | 12/2019 | Pao | H04L 1/1887 |
| 2020/0100126 A1 | 3/2020 | Salah et al. | |
| 2020/0145984 A1 | 5/2020 | Hosseini et al. | |
| 2020/0280474 A1* | 9/2020 | Babaei | H04W 72/1268 |
| 2020/0314678 A1* | 10/2020 | Lee | H04W 24/10 |
| 2020/0322972 A1* | 10/2020 | Hosseini | H04W 72/14 |

(Continued)

OTHER PUBLICATIONS

Takeda, Kazuki et al., Understanding the Heart of the 5G Air Interface: An Overview of Physical Downlink Control Channel for 5G New Radio (NR), Oct. 3, 2019, pp. 8.

*Primary Examiner* — Ivan O Latorre
(74) *Attorney, Agent, or Firm* — The Farrell Law Firm, P.C.

(57) ABSTRACT

Methods and apparatuses are provided for monitoring a physical downlink control channel (PDCCH). A first time gap is set from an end of the PDCCH to a beginning of a physical downlink shared channel (PDSCH). A second time gap is set from an end of the PDSCH to a beginning of a physical uplink control channel (PUCCH). A high priority channel and a low priority channel are configured in a PDCCH monitoring span. At least one parameter indicating a minimum amount of additional time required by a user equipment (UE) for processing the low priority channel, is received from the UE. Based on the at least one parameter, the UE is configured with at least one offset used to increase at least one of the first time gap and the second time gap.

21 Claims, 6 Drawing Sheets

(56) References Cited

U.S. PATENT DOCUMENTS

| | | | | |
|---|---|---|---|---|
| 2020/0367241 A1* | 11/2020 | Hosseini | ................. | H04W 8/24 |
| 2020/0396672 A1* | 12/2020 | Hong | .................... | H04W 36/08 |
| 2021/0006376 A1* | 1/2021 | Cirik | .................... | H04L 5/0094 |
| 2021/0037484 A1* | 2/2021 | Zhou | ................... | H04W 52/325 |
| 2021/0050933 A1* | 2/2021 | Myung | ................. | H04L 5/0053 |
| 2021/0105761 A1* | 4/2021 | Cheng | ................ | H04B 7/18513 |
| 2021/0168781 A1* | 6/2021 | Lee | .................... | H04W 72/042 |
| 2021/0345323 A1* | 11/2021 | Axmon | ............. | H04W 72/0446 |

* cited by examiner

SYSTEM AND METHOD FOR PHYSICAL DOWNLINK CONTROL CHANNEL MONITORING

PRIORITY

This application is based on and claims priority under 35 U.S.C. § 119(e) to a U.S. Provisional Patent Application filed on Oct. 14, 2019 in the United States Patent and Trademark Office (USPTO) and assigned Ser. No. 62/914,924, the contents of which are incorporated herein by reference.

FIELD

The present disclosure relates generally to channel monitoring, and more particularly, to physical downlink control channel (PDCCH) monitoring for a span configured for both high priority and low priority channels.

BACKGROUND

In $3^{rd}$ Generation Partnership Project (3GPP) $5^{th}$ Generation (5G) Release 16 (rel-16), enhanced PDCCH monitoring occasions for ultra-reliable low latency communication (uRLLC) were presented. Additionally, user equipment (UE) control channel element (CCE) and blind decoding (BD) capabilities were defined per span, rather than per slot. A span is a number of consecutive symbols in a slot where the UE is configured to monitor PDCCH. A span is defined based on configured search spaces (SSs) and monitoring occasions (MOs) for a given serving cell, and based on a set (X, Y) reported by a UE. X is the gap between the start of two consecutive spans, and Y is a span length in symbols. A span starts at a first symbol where a PDCCH MO starts and ends at a last symbol where the PDCCH MO ends. The same span pattern repeats in each slot.

For 5G Release 15 (rel-15) capability, BD/CCE limits are defined per slot as a function of sub-carrier spacing (SCS) of the cell. For 5G rel-16 capability, the BD/CCE limits can be defined per span.

When a UE supports both 5G rel-15 capability and 5G rel-16 capability, PDCCH monitoring is performed for both enhanced mobile broadband (eMBB) (low priority channels) and uRLLC (high priority channels).

For a 5G UE that supports an enhanced PDCCH monitoring capability, PDCCH monitoring based on 5G rel-15 capability for eMBB and PDCCH monitoring based on 5G rel-16 capability for uRLLC may be configured to the UE on the same carrier. Specifically, the UE is configured with mixed slot-based and span-based PDCCH monitoring on a serving cell. For the 5G PDCCH monitoring capability, a limit on the maximum number of non-overlapping CCEs for channel estimation per PDCCH monitoring span is the same across the different spans within a slot.

The UE performs BD/CCE monitoring per slot for eMBB and performs BD/CCE monitoring per span for uRLLC. uRLLC search spaces (SSs) and eMBB SSs may correspond to different control resource sets (CORESETs). uRLLC SSs and eMBB SSs also have a different SS identifiers (IDs), when having the same CORESET. uRLLC and eMBB can also be differentiated based on a corresponding downlink control information (DCI) format or size. Accordingly, the UE is able to determine whether a given BD/CCE corresponds to uRLLC or eMBB prior to processing the corresponding PDCCH candidate.

If the UE has two processing pipelines, the UE is able to route the BD/CCE to one of the two pipelines according to service type or priority (e.g., high priority uRLLC or low priority eMBB). Alternatively, if the UE has a single pipeline, the UE prioritizes the BD/CCE candidates of uRLLC over the BD/CCE candidates of eMBB. For example, the UE first processes all of the BD/CCE candidates of uRLLC in a given span, and only when it has finished, will the UE begin processing the BD/CCE candidates of eMBB. However, such a prioritization may result in an inability to meet a timeline for eMBB processing.

SUMMARY

According to one embodiment, a method is provided for monitoring a PDCCH by a base station (BS). A first time gap is set from an end of the PDCCH to a beginning of a physical downlink shared channel (PDSCH). A second time gap is set from an end of the PDSCH to a beginning of a physical uplink control channel (PUCCH). A high priority channel and a low priority channel are configured in a PDCCH monitoring span. At least one parameter indicating a minimum amount of additional time required by the UE for processing the low priority channel, is received from the UE. Based on the at least one parameter, the UE is configured with at least one offset used to increase at least one of the first time gap and the second time gap.

According to one embodiment, a method is provided for monitoring a PDCCH by a BS. A time gap is set from an end of the PDCCH to a beginning of a physical uplink shared channel (PUSCH). A high priority channel and a low priority channel are configured in a PDCCH monitoring span. A parameter indicating a minimum amount of additional time required by a UE for processing the low priority channel, is received from the UE. Based on the parameter, the UE is configured with an offset used to increase the time gap According to one embodiment, a method is provided for monitoring a PDCCH by a UE. At least one parameter indicating a minimum amount of additional time required by the UE for processing a low priority channel, is transmitted to a BS, when the BS configures a high priority channel and the low priority channel in a PDCCH monitoring span. At least one offset that is based on the at least one parameter, is received from the BS. At least one of a first time gap and a second time gap is increased based on the at least one offset. The first time gap is set from an end of the PDCCH to a beginning of a PDSCH, and the second time gap is set from an end of the PDSCH to a beginning of a PUCCH According to one embodiment a method is provided for monitoring a PDCCH by a UE. A parameter indicating a minimum amount of additional time required by the UE for processing a low priority channel, is transmitted to a BS, when the BS configures a high priority channel and the low priority channel in a PDCCH monitoring span. An offset that is based on the parameter is received from the BS. A time gap is increased based on the at least one offset. The time gap is set from an end of the PDCCH to a beginning of a PUSCH According to one embodiment, a BS is provided that includes a processor and a non-transitory computer readable storage medium storing instructions. When executed, the instructions cause the processor to: set a first time gap from an end of a PDCCH to a beginning of a PDSCH; set a second time gap from an end of the PDSCH to a beginning of a PUCCH; configure a high priority channel and a low priority channel in a PDCCH monitoring span; receive, from a UE, at least one parameter indicating a minimum amount of additional time required by the UE for processing the low priority channel; and based on the at least one parameter, configure the UE with at least one offset used to increase at least one of the first time gap and the second time gap.

According to one embodiment, a BS is provided that includes a processor and a non-transitory computer readable storage medium storing instructions. When executed, the instructions cause the processor to: set a time gap from an end of a PDCCH to a beginning of a PUSCH; configure a high priority channel and a low priority channel in a PDCCH monitoring span; receive, from a UE, a parameter indicating a minimum amount of additional time required by the UE for processing the low priority channel; and based on the parameter, configuring the UE with an offset used to increase the time gap.

According to one embodiment, a UE is provided that includes a processor and a non-transitory computer readable storage medium storing instructions. When executed, the instructions cause the processor to: transmit, to a BS, at least one parameter indicating a minimum amount of additional time required by the UE for processing a low priority channel, when the BS configures a high priority channel and the low priority channel in a PDCCH monitoring span; receive, from the BS, at least one offset that is based on the at least one parameter; and increase at least one of a first time gap and a second time gap based on the at least one offset. The first time gap is set from an end of a PDCCH to a beginning of a PDSCH, and the second time gap is set from an end of the PDSCH to a beginning of a PUCCH.

According to one embodiment, a UE is provided that includes a processor and a non-transitory computer readable storage medium storing instructions. When executed, the instructions cause the processor to: transmit, to a BS, a parameter indicating a minimum amount of additional time required by the UE for processing a low priority channel, when the BS configures a high priority channel and the low priority channel in a PDCCH monitoring span; receive, from the BS, an offset that is based on the parameter; and increase a time gap based on the at least one offset. The time gap is set from an end of a PDCCH to a beginning of a PUSCH.

BRIEF DESCRIPTION OF THE DRAWINGS

The above and other aspects, features, and advantages of certain embodiments of the present disclosure will be more apparent from the following detailed description, when taken in conjunction with the accompanying drawings, in which.

DETAILED DESCRIPTION

Figure 1:
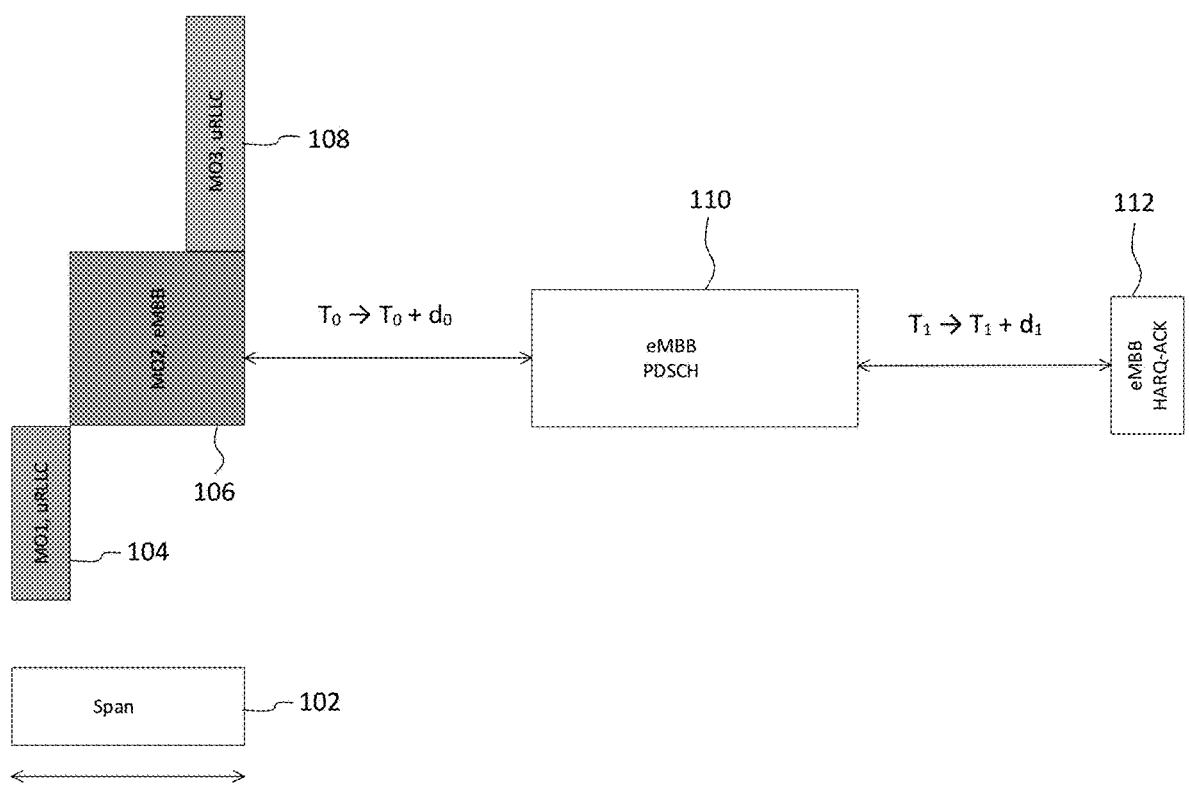
FIG. 1 is a diagram a diagram illustrating a span configured with two MOs for uRLLC and one MO for eMBB, according to an embodiment.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate the existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "$1^{st}$," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, such as, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

According to an embodiment, when a UE operates mixed slot-based and span-based on a serving cell, and is not able to process both uRLLC and eMBB traffic simultaneously, additional minimum processing time is provided for the eMBB PDCCH, PDSCH, PUSCH, or other types of eMBB channels. The extra processing time is determined according to UE capability signaling and RRC configuration signaling.

Thus, the UE is able to process both eMBB and uRLLC control and data channels without any significant impact on their respective requirements. A latency requirement of uRLLC is unaltered, while a latency requirement of eMBB is adjusted by a small amount.

With eMBB processing time relaxation, the UE processes the eMBB with an increased PDCCH-to-PDSCH or PDSCH-to-PUCCH or PDCCH-to-PUSCH time gap.

Referring initially to FIG. 1, a diagram illustrates a span configured with two MOs for uRLLC and one MO for eMBB, according to an embodiment. Within a span 102 of PDCCH, the UE performs BD/CCE processing for uRLLC at a first MO, MO1 104, and a third MO, MO3 108. Once processing is completed in the MO1 104 and the MO3 108, the UE performs BD/CCE processing for eMBB at a second MO, MO2 106.

If the MO1 104 and the MO3 108 do not exist in the span 102, and only eMBB is scheduled in the MO2 106, a scheduling offset gap $T_0$ and a PDSCH-to-hybrid automatic repeat request (HARD) gap $T_1$ are set based on minimum processing time capabilities. $T_0$ is the time gap between an end of the PDCCH in the span 102 and a beginning of an eMBB PDSCH 110. $T_1$ is the time gap between an end of the eMBB PDSCH 110 and a beginning of an eMBB HARQ-acknowledgement (ACK) 112 (i.e., PUCCH). $T_0$ is determined by the time-domain resource allocation (TDRA) field in eMBB DCI, and $T_1$ is determined by the PDSCH-to-HARQ-ACK slot-based gap field and PUCCH format indicator (PFI) field in eMBB DCI.

However, with the addition of the MO1 104 and the MO3 108 to the span 102, and the resulting processing of both eMBB and uRLLC in the span 102, eMBB processing time relaxation is provided through the addition of an offset $d_0 \geq d_0^{offset,cap}$ to $T_0$ and/or an offset $d_1 \geq d_1^{offset,cap}$ to $T_1$.

The parameter $d_0^{offset,cap}$ is a UE capability parameter that indicates a minimum additional time that the UE requires for PDSCH reception at the eMBB PDSCH 110. The parameter $d_1^{offset,cap}$ is a UE capability parameter that indicates a minimum additional time that the UE requires for HARQ-ACK preparation for the eMBB HARQ-ACK 112. These two parameters are provided from the UE, to a BS. The parameter $d_0^{offset,cap}$ may be reported for different values of SCS (scheduling cell and scheduled cell), and the parameter $d_1^{offset,cap}$ may be reported for different values of SCS (scheduled cell and UL cell for PUCCH transmission).

The BS determines the offsets $d_0$ and $d_1$ based on the corresponding received parameters, and configures the UE via RRC. Specifically, the offset $d_0$ is added to $T_0$ to increase the time between PDCCH and PDSCH, and the offset $d_1$ is added to $T_1$ to increase the time between PDSCH and HARQ-ACK (PUCCH). The UE may be configured with the offset $d_0$ for different values of SCS (scheduling cell and scheduled cell), and may be configured with the offset $d_1$ for different values of SCS (scheduled cell and UL cell for PUCCH transmission).

Figure 2:
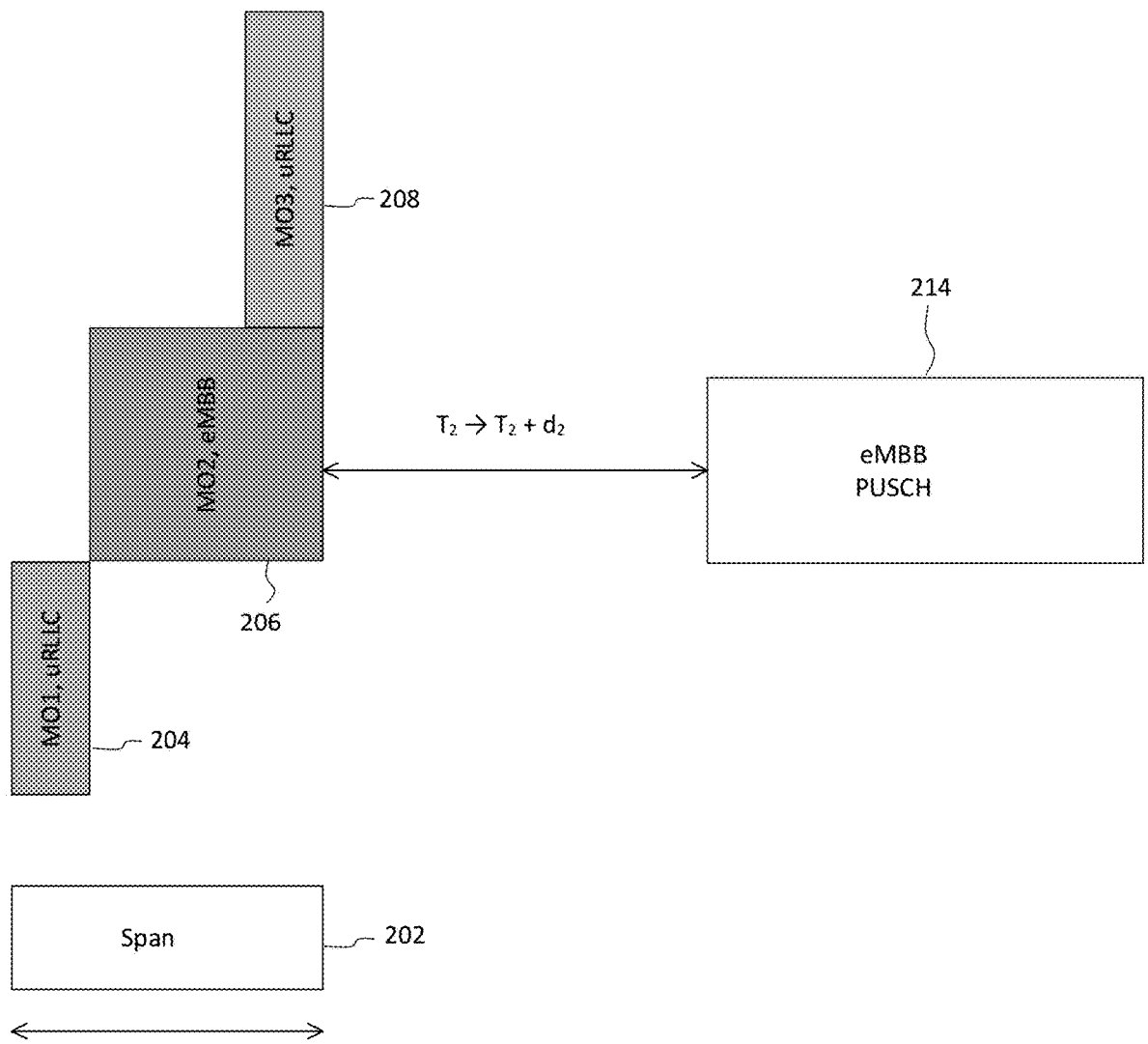
FIG. 2 is a diagram illustrating a span configured with two MOs for uRLLC and one MO for eMBB, according to another embodiment.

Referring now to FIG. 2, a diagram illustrates a span configured with two MOs for uRLLC and one MO for eMBB, according to another embodiment. Similar to the embodiment of FIG. 1, within a span 202 of PDCCH, the UE performs BD/CCE processing for uRLLC at a first MO, MO1 204, and a third MO, MO3 208. Upon completion of processing of the MO1 204 and the MO3 208, the UE performs BD/CCE processing for eMBB at a second MO, MO2 206.

If the MO1 204 and the MO3 208 do not exist in the span 202, and only eMBB is scheduled in the MO2 206, a scheduling offset gap $T_2$ is set based on a minimum processing time capability. $T_2$ is the time gap between an end of the PDCCH and a beginning of an eMBB PUSCH 214. $T_2$ is determined by eMBB DCI.

With the addition of the MO1 204 and the MO3 208 to the span 202, and the resulting processing of both eMBB and uRLLC in the span 202, eMBB processing time relaxation is provided through the addition of an offset $d_2 \geq d_2^{offset,cap}$ to $T_2$. The parameter $d_2^{offset,cap}$ is a UE capability parameter that indicates a minimum additional time that the UE requires for PUSCH transmission at the eMBB PUSCH 214. The parameter is provided from the UE to the BS. The parameter may be reported for different values of SCS (scheduling cell and PUSHC cell).

The BS determines the offset $d_2$ based on the received parameter, and configures the UE via RRC. Specifically, the offset $d_2$ is added to $T_2$ to increase the time between PDCCH and PUSCH. The UE may be configured with the offset $d_2$ for different values of SCS (scheduling cell and PUSHC cell).

According to an embodiment, the UE also adds the offset $d_0 \geq d_0^{offset,cap}$ to $T_0$, the offset $d_1 \geq d_1^{offset,cap}$ to $T_1$ and/or the offset $d_2 \geq d_2^{offset,cap}$ to $T_2$, when different MOs corresponding to different service types or priorities (uRLLC with high priority and eMBB with low priority) are configured in a slot, as opposed to a span, as described above in FIGS. 1 and 2.

An aperiodic channel state information (CSI) request/reporting time offset, or a sounding reference signal (SRS) transmission time offset may be defined as time gap $T_{other}$. When different MOs corresponding to different service types or priorities (uRLLC with high priority and eMBB with low priority) are configured in a slot or a PDCCH MO span, the UE may add an offset $d_{other} \geq d_{other}^{offset,cap}$ to $T_{other}$. The time gap $T_{other}$ is indicated in eMBB DCI. The parameter $d_{other}^{offset,cap}$ is a UE capability parameter that indicates the minimum additional time that the UE requires for eMBB processing. The UE provides the parameter to the BS, and the BS configures the UE with the offset $d_{other}$ via RRC signaling.

Scheduling time gaps $T_i$ and added offsets $d_i$ may be defined in terms of time (seconds) or OFDM symbols (OS). The scheduling time gaps $T_i$ and added offsets $d_i$ can be a function of numerology or SCS of the serving cell (scheduled or scheduling).

The UE can assume relaxation for eMBB processing time (i.e., one or more of the added offsets are non-zeros), if uRLLC traffic is scheduled in the uRLLC MOs in the span or slot. Specifically, eMBB relaxation is not assumed if uRLLC is not scheduled in the span or slot.

The UE can assume that relaxation is not provided for eMBB processing time (i.e., the added offsets are zeros), if there is a first minimum number of OFDM symbols between an ending symbol of the latest uRLLC MO (e.g., the MO1 104 of FIG. 1, or the MO1 204 of FIG. 2) and a starting symbol of the eMBB MO (e.g., the MO2 106 of FIG. 1 or the MO2 206 of FIG. 2), and if there a second minimum number of symbols between the ending symbol of the eMBB MO (e.g., the MO2 106 of FIG. 1 or the MO2 206 of FIG. 2) and a starting symbol of a next uRLLC MO (e.g., the MO3 108 of FIG. 1, or the MO3 208 of FIG. 2).

Figure 3:
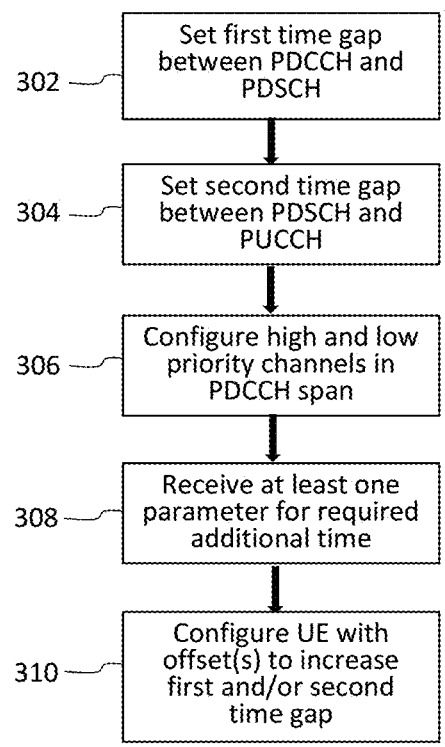
FIG. 3 is a flowchart illustrating a method for monitoring a PDCCH, by a BS, according to an embodiment.

FIG. 3 is a flowchart illustrating a method for monitoring a PDCCH, by a BS, according to an embodiment. Specifically, the flowchart of FIG. 3 corresponds to the embodiment illustrated in FIG. 1.

At 302, a first time gap is set from an end of the PDCCH to a beginning of a PDSCH. At 304, a second time gap is set from an end of the PDSCH to a beginning of a PUCCH. The first time gap and the second time gap are set based on a configuration of the low priority channel (without the high priority channel) in a PDCCH monitoring span. The PDCCH monitoring span is for one of BD and CCE monitoring, and is embodied as a slot or one of a plurality of spans within a slot.

At 306, a high priority channel and a low priority channel are configured in the PDCCH monitoring span. The high priority channel may be embodied as a uRLLC service type and the low priority channel may be embodied as an eMBB service type.

At 308, at least one parameter is received indicating a minimum amount of additional time that is required by UE for processing the low priority channel. The at least one parameter may include a first parameter indicating a minimum amount of additional time required by the UE for PDSCH reception, and a second parameter indicating a minimum amount of additional time required by the UE for HARQ-ACK preparation.

At 310, based on the at least one parameter, the UE is configured with at least one offset used to increase at least one of the first time gap and the second time gap. The UE may be configured by the BS via RRC signaling. The at least one offset may include a first offset based on the first parameter to increase the first time gap, and a second offset based on the second parameter to increase the second time gap.

Figure 4:
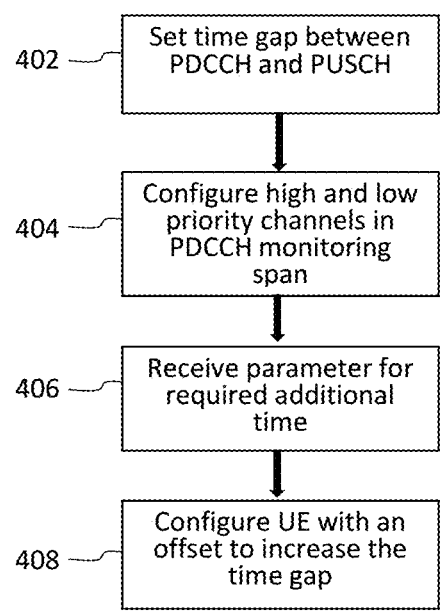
FIG. 4 is a flowchart illustrating a method for monitoring a PDCCH, by a BS, according to another embodiment.

FIG. 4 is a flowchart illustrating a method for monitoring PDCCH, by a BS, according to another embodiment. Specifically, the flowchart of FIG. 4 corresponds to the embodiment illustrated in FIG. 2.

At 402, a time gap is set from an end of the PDCCH to a beginning of a PUSCH. The time gap is set based on a configuration of the low priority channel (without the high priority channel) in a PDCCH monitoring span. The PDCCH monitoring span is for one of BD and CCE monitoring, and is embodied as a slot or one of a plurality of spans within a slot.

At 404, a high priority channel and a low priority channel are configured in a PDCCH monitoring span. The high priority channel may be embodied as a uRLLC service type and the low priority channel may be embodied as an eMBB service type.

At 406, a parameter is received from a UE that indicates a minimum amount of additional time that is required by the UE for processing the low priority channel. The parameter indicates a minimum amount of additional time that is required by the UE for PUSCH transmission. At 408, based on the parameter, the UE is configured with an offset used to increase the time gap. The UE may be configured by the BS via RRC signaling.

Figure 5:
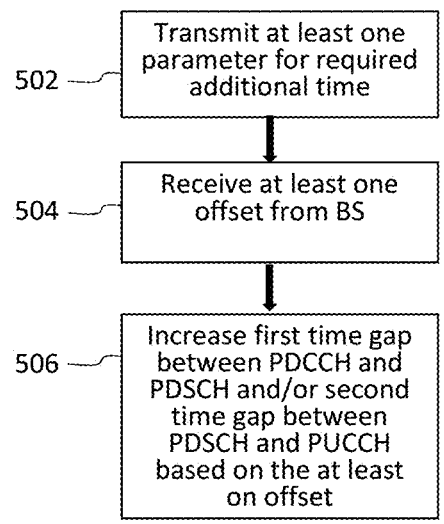
FIG. 5 is a a flowchart illustrating a method for monitoring a PDCCH, by a UE, according to an embodiment.

Referring to FIG. 5, a flowchart illustrates a method for monitoring a PDCCH, by a UE, according to an embodiment. Specifically, the flowchart of FIG. 5 corresponds to the embodiment illustrated in FIG. 1.

At 502, at least one parameter is transmitted to a BS that indicates a minimum amount of additional time that is required by the UE for processing a low priority channel, when the BS configures a high priority channel and the low priority channel in a PDCCH monitoring span. The high priority channel may be embodied as a uRLLC service type and the low priority channel may be embodied as an eMBB service type. The PDCCH monitoring span is for one of BD and CCE monitoring, and is embodied as a slot or one of a plurality of spans within a slot.

The at least one parameter may be a first parameter indicating a minimum amount of additional time required by the UE for PDSCH reception, and a second parameter indicating a minimum amount of additional time that is required by the UE for HARQ-ACK preparation.

At 504, at least one offset that is based on the at least one parameter is received from the BS. At 506, at least one of a first time gap and a second time gap is increased based on the at least one offset. The UE may be configured by the BS via RRC signaling. The first time gap is set from an end of the PDCCH to a beginning of a PDSCH, and the second time gap is set from an end of the PDSCH to a beginning of a PUCCH. The first time gap and the second time gap are initially set based on a configuration of the low priority channel (without the high priority channel) in the PDCCH monitoring span.

The at least one offset may be a first offset based on the first parameter to increase the first time gap, and a second offset based on the second parameter to increase the second time gap.

Figure 6:
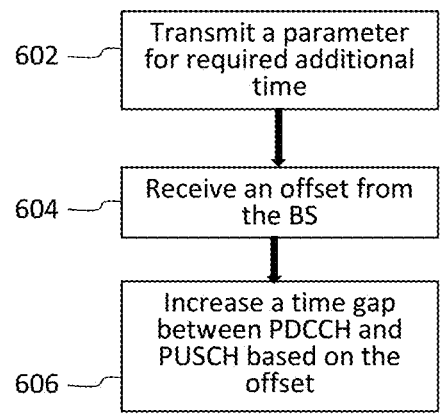
FIG. 6 is a flowchart illustrating a method for monitoring a PDCCH, by a UE, according to another embodiment.

FIG. 6 is a flowchart illustrating a method for monitoring a PDCCH, by a UE, according to another embodiment. Specifically, the flowchart of FIG. 6 corresponds to the embodiment illustrated in FIG. 2.

At 602, a parameter is transmitted to a BS that indicates a minimum amount of additional time that is required by the UE for processing a low priority channel, when the BS configures a high priority channel and the low priority channel in a PDCCH monitoring span. The high priority channel may be embodied as a uRLLC service type and the low priority channel may be embodied as an eMBB service type. The parameter indicates a minimum amount of additional time that is required by the UE for PUSCH transmission. The PDCCH monitoring span is for one of BD and CCE monitoring, and is embodied as a slot or one of a plurality of spans within a slot.

At 604, an offset that is based on the parameter is received from the BS. At 606, a time gap is increased based on the offset. The UE may be configured by the BS via RRC signaling. The time gap is set from an end of the PDCCH to a beginning of a PUSCH. The time gap is initially set based on a configuration of the low priority channel (without the high priority channel) in the PDCCH monitoring span.

Figure 7:
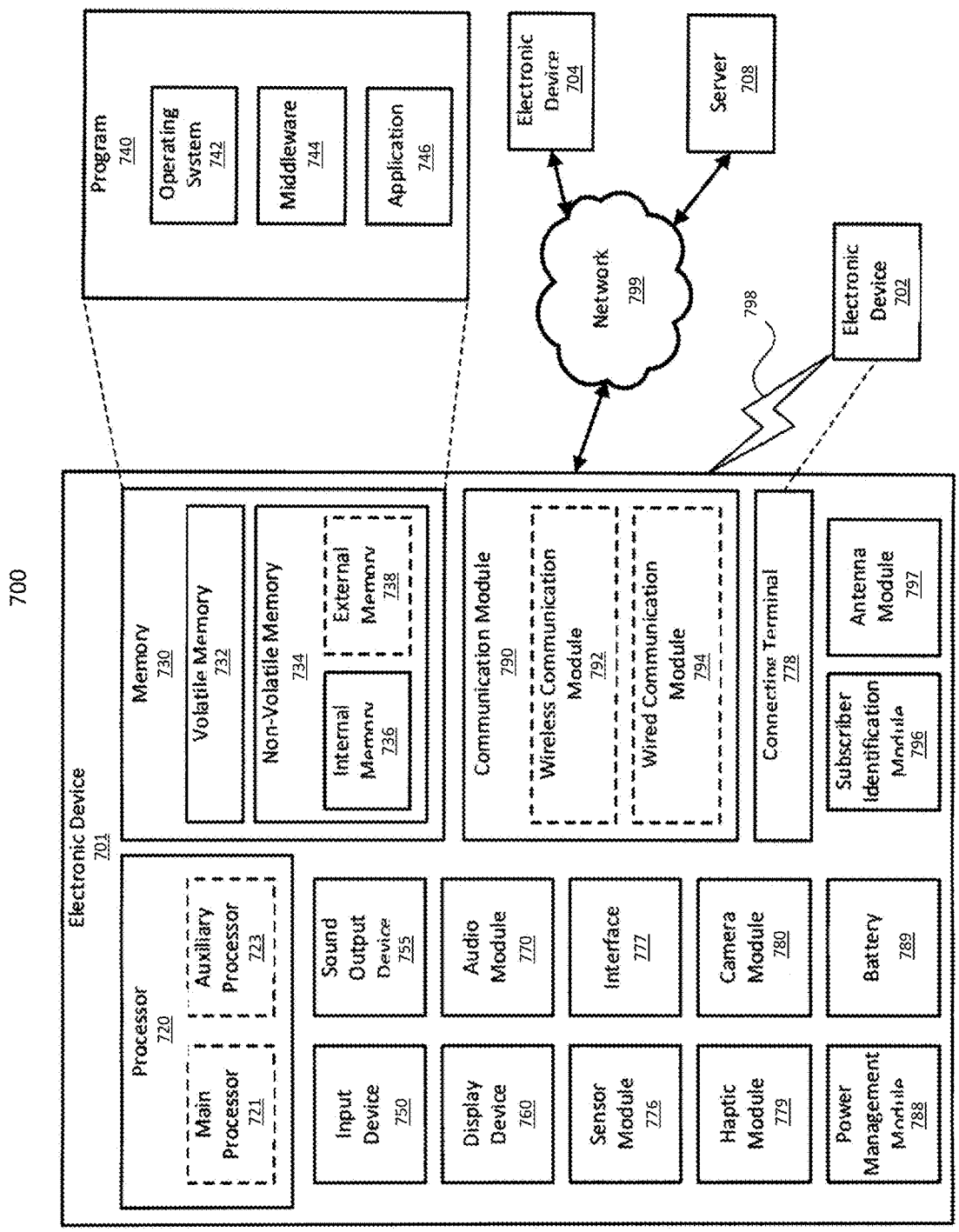
FIG. 7 is a block diagram of an electronic device in a network environment, according to an embodiment.

FIG. 7 is a block diagram of an electronic device in a network environment, according to one embodiment. Referring to FIG. 7, an electronic device 701 in a network environment 700 may communicate with an electronic device 702 via a first network 798 (e.g., a short-range wireless communication network), or an electronic device 704 or a server 708 via a second network 799 (e.g., a long-range wireless communication network). The electronic device 701 may communicate with the electronic device 704 via the server 708. The electronic device 701 may include a processor 720, a memory 730, an input device 750, a sound output device 755, a display device 760, an audio module 770, a sensor module 776, an interface 777, a haptic module 779, a camera module 780, a power management module 788, a battery 789, a communication module 790, a subscriber identification module (SIM) 796, or an antenna module 797. In one embodiment, at least one (e.g., the display device 760 or the camera module 780) of the components may be omitted from the electronic device 701, or one or more other components may be added to the electronic device 701. Some of the components may be implemented as a single integrated circuit (IC). For example, the sensor module 776 (e.g., a fingerprint sensor, an iris sensor, or an illuminance sensor) may be embedded in the display device 760 (e.g., a display).

The processor 720 may execute, for example, software (e.g., a program 740) to control at least one other component (e.g., a hardware or a software component) of the electronic device 701 coupled with the processor 720, and may perform various data processing or computations. As at least part of the data processing or computations, the processor 720 may load a command or data received from another component (e.g., the sensor module 776 or the communication module 790) in volatile memory 732, process the command or the data stored in the volatile memory 732, and store resulting data in non-volatile memory 734. The processor 720 may include a main processor 721 (e.g., a central processing unit (CPU) or an application processor (AP)), and an auxiliary processor 723 (e.g., a graphics processing unit (GPU), an image signal processor (ISP), a sensor hub processor, or a communication processor (CP)) that is operable independently from, or in conjunction with, the main processor 721. Additionally or alternatively, the auxiliary processor 723 may be adapted to consume less power than the main processor 721, or execute a particular function. The auxiliary processor 723 may be implemented as being separate from, or a part of, the main processor 721.

The auxiliary processor 723 may control at least some of the functions or states related to at least one component (e.g., the display device 760, the sensor module 776, or the communication module 790) among the components of the electronic device 701, instead of the main processor 721 while the main processor 721 is in an inactive (e.g., sleep) state, or together with the main processor 721 while the main processor 721 is in an active state (e.g., executing an application). The auxiliary processor 723 (e.g., an image signal processor or a communication processor) may be implemented as part of another component (e.g., the camera module 780 or the communication module 790) functionally related to the auxiliary processor 723.

The memory 730 may store various data used by at least one component (e.g., the processor 720 or the sensor module 776) of the electronic device 701. The various data may include, for example, software (e.g., the program 740) and input data or output data for a command related thereto. The memory 730 may include the volatile memory 732 or the non-volatile memory 734.

The program 740 may be stored in the memory 730 as software, and may include, for example, an operating system (OS) 742, middleware 744, or an application 746.

The input device 750 may receive a command or data to be used by other component (e.g., the processor 720) of the electronic device 701, from the outside (e.g., a user) of the electronic device 701. The input device 750 may include, for example, a microphone, a mouse, or a keyboard.

The sound output device 755 may output sound signals to the outside of the electronic device 701. The sound output device 755 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 760 may visually provide information to the outside (e.g., a user) of the electronic device 701. The display device 760 may include, for example, a display, a hologram device, or a projector and control circuitry to control a corresponding one of the display, hologram device, and projector. The display device 760 may include touch circuitry adapted to detect a touch, or sensor circuitry (e.g., a pressure sensor) adapted to measure the intensity of force incurred by the touch.

The audio module 770 may convert a sound into an electrical signal and vice versa. The audio module 770 may obtain the sound via the input device 750, or output the sound via the sound output device 755 or a headphone of an external electronic device 702 directly (e.g., wired) or wirelessly coupled with the electronic device 701.

The sensor module 776 may detect an operational state (e.g., power or temperature) of the electronic device 701 or an environmental state (e.g., a state of a user) external to the electronic device 701, and then generate an electrical signal or data value corresponding to the detected state. The sensor module 776 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 777 may support one or more specified protocols to be used for the electronic device 701 to be coupled with the external electronic device 702 directly (e.g., wired) or wirelessly. The interface 777 may include, for example, a high definition multimedia interface (HDMI), a universal serial bus (USB) interface, a secure digital (SD) card interface, or an audio interface.

A connecting terminal 778 may include a connector via which the electronic device 701 may be physically connected with the external electronic device 702. The connecting terminal 778 may include, for example, an HDMI connector, a USB connector, an SD card connector, or an audio connector (e.g., a headphone connector).

The haptic module 779 may convert an electrical signal into a mechanical stimulus (e.g., a vibration or a movement)

or an electrical stimulus which may be recognized by a user via tactile sensation or kinesthetic sensation. The haptic module 779 may include, for example, a motor, a piezoelectric element, or an electrical stimulator.

The camera module 780 may capture a still image or moving images. The camera module 780 may include one or more lenses, image sensors, image signal processors, or flashes.

The power management module 788 may manage power supplied to the electronic device 701. The power management module 788 may be implemented as at least part of, for example, a power management integrated circuit (PMIC).

The battery 789 may supply power to at least one component of the electronic device 701. The battery 789 may include, for example, a primary cell which is not rechargeable, a secondary cell which is rechargeable, or a fuel cell.

The communication module 790 may support establishing a direct (e.g., wired) communication channel or a wireless communication channel between the electronic device 701 and the external electronic device (e.g., the electronic device 702, the electronic device 704, or the server 708) and performing communication via the established communication channel. The communication module 790 may include one or more communication processors that are operable independently from the processor 720 (e.g., the AP) and supports a direct (e.g., wired) communication or a wireless communication. The communication module 790 may include a wireless communication module 792 (e.g., a cellular communication module, a short-range wireless communication module, or a global navigation satellite system (GNSS) communication module) or a wired communication module 794 (e.g., a local area network (LAN) communication module or a power line communication (PLC) module). A corresponding one of these communication modules may communicate with the external electronic device via the first network 798 (e.g., a short-range communication network, such as Bluetooth™, wireless-fidelity (Wi-Fi) direct, or a standard of the Infrared Data Association (IrDA)) or the second network 799 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 792 may identify and authenticate the electronic device 701 in a communication network, such as the first network 798 or the second network 799, using subscriber information (e.g., international mobile subscriber identity (IMSI)) stored in the subscriber identification module 796.

The antenna module 797 may transmit or receive a signal or power to or from the outside (e.g., the external electronic device) of the electronic device 701. The antenna module 797 may include one or more antennas, and, therefrom, at least one antenna appropriate for a communication scheme used in the communication network, such as the first network 798 or the second network 799, may be selected, for example, by the communication module 790 (e.g., the wireless communication module 792). The signal or the power may then be transmitted or received between the communication module 790 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

Commands or data may be transmitted or received between the electronic device 701 and the external electronic device 704 via the server 708 coupled with the second network 799. Each of the electronic devices 702 and 704 may be a device of a same type as, or a different type, from the electronic device 701. All or some of operations to be executed at the electronic device 701 may be executed at one or more of the external electronic devices 702, 704, or 708. For example, if the electronic device 701 should perform a function or a service automatically, or in response to a request from a user or another device, the electronic device 701, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 701. The electronic device 701 may provide the outcome, with or without further processing of the outcome, as at least part of a reply to the request. To that end, a cloud computing, distributed computing, or client-server computing technology may be used, for example.

One embodiment may be implemented as software (e.g., the program 740) including one or more instructions that are stored in a storage medium (e.g., internal memory 736 or external memory 738) that is readable by a machine (e.g., the electronic device 701). For example, a processor of the electronic device 701 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method for monitoring a physical downlink control channel (PDCCH), by a base station (BS), the method comprising:
    setting a first time gap from an end of the PDCCH to a beginning of a physical downlink shared channel (PDSCH), based on minimum processing capabilities with respect to a PDCCH monitoring span being configured without a high priority channel;
    setting a second time gap from an end of the PDSCH to a beginning of a physical uplink control channel (PUCCH), based on the minimum processing capabilities with respect to the PDCCH monitoring span being configured without the high priority channel;
    configuring the high priority channel and a low priority channel in the PDCCH monitoring span;
    receiving, from a user equipment (UE), at least one parameter indicating a minimum amount of additional time required by the UE for processing the low priority channel based on the PDCCH monitoring span configured with the high priority channel and the low priority channel; and
    based on the at least one parameter, configuring the UE with at least one offset used to increase at least one of the first time gap and the second time gap.

2. The method of claim 1, wherein the high priority channel comprises an ultra-reliable low latency communication (uRLLC) service type and the low priority channel comprises an enhanced mobile broadband (eMBB) service type.

3. The method of claim 1, wherein receiving the at least one parameter comprises receiving at least one of:
    a first parameter indicating a minimum amount of additional time required by the UE for PDSCH reception; and
    a second parameter indicating a minimum amount of additional time required by the UE for hybrid automatic repeat request (HARQ)-acknowledgement (ACK) preparation.

4. The method of claim 3, wherein configuring the UE comprises configuring the UE with at least one of:
    a first offset based on the first parameter to increase the first time gap; and
    a second offset based on the second parameter to increase the second time gap.

5. The method of claim 1, wherein the UE is configured via radio resource control (RRC) signalling.

6. The method of claim 1, wherein the PDCCH monitoring span is for one of blind detection (BD) and control channel element (CCE) monitoring.

7. The method of claim 1, wherein the PDCCH monitoring span comprises a slot or one of a plurality of spans within a slot.

8. A method for monitoring a physical downlink control channel (PDCCH), by a base station (BS), the method comprising:
    setting a time gap from an end of the PDCCH to a beginning of a physical uplink shared channel (PUSCH), based on a minimum processing capability with respect to a PDCCH monitoring span being configured without a high priority channel;
    configuring the high priority channel and a low priority channel in the PDCCH monitoring span;
    receiving, from a user equipment (UE), a parameter indicating a minimum amount of additional time required by the UE for processing the low priority channel based on the PDCCH monitoring span configured with the high priority channel and the low priority channel; and
    based on the parameter, configuring the UE with an offset used to increase the time gap.

9. The method of claim 8, wherein the high priority channel comprises an ultra-reliable low latency communication (uRLLC) service type and the low priority channel comprises an enhanced mobile broadband (eMBB) service type.

10. The method of claim 8, wherein the parameter indicates a minimum amount of additional time required by the UE for PUSCH transmission.

11. A method for monitoring a physical downlink control channel (PDCCH), by a user equipment (UE), the method comprising:
    transmitting, to a base station (BS), at least one parameter indicating a minimum amount of additional time required by the UE for processing a low priority channel, when the BS configures a high priority channel and the low priority channel in a PDCCH monitoring span;
    receiving, from the BS, at least one offset that is based on the at least one parameter; and
    increasing at least one of a first time gap and a second time gap based on the at least one offset,
    wherein the first time gap is set from an end of the PDCCH to a beginning of a physical downlink shared channel (PDSCH) based on minimum processing capabilities with respect to the PDCCH monitoring span being configured without the high priority channel, and the second time gap is set from an end of the PDSCH to a beginning of a physical uplink control channel (PUCCH) based on the minimum processing capabilities with respect to the PDCCH monitoring span being configured without the high priority channel.

12. The method of claim 11, wherein the high priority channel comprises an ultra-reliable low latency communication (uRLLC) service type and the low priority channel comprises an enhanced mobile broadband (eMBB) service type.

13. The method of claim 11, wherein transmitting the at least one parameter comprises transmitting at least one of:
    a first parameter indicating a minimum amount of additional time required by the UE for PDSCH reception; and
    a second parameter indicating a minimum amount of additional time required by the UE for hybrid automatic repeat request (HARQ)-acknowledgement (ACK) preparation.

14. The method of claim 13, wherein receiving the at least one offset comprises receiving at least one of:
- a first offset based on the first parameter to increase the first time gap; and
- a second offset based on the second parameter to increase the second time gap.

15. A method for monitoring a physical downlink control channel (PDCCH), by a user equipment (UE), the method comprising:
- transmitting, to a base station (BS), a parameter indicating a minimum amount of additional time required by the UE for processing a low priority channel, when the BS configures a high priority channel and the low priority channel in a PDCCH monitoring span;
- receiving, from the BS, an offset that is based on the parameter; and,
- increasing a time gap based on the at least one offset,
- wherein the time gap is set from an end of the PDCCH to a beginning of a physical uplink shared channel (PUSCH), based on a minimum processing capability with respect to the PDCCH monitoring span being configured without the high priority channel.

16. The method of claim 15, wherein the high priority channel comprises an ultra-reliable low latency communication (uRLLC) service type and the low priority channel comprises an enhanced mobile broadband (eMBB) service type.

17. The method of claim 15, wherein the parameter indicates a minimum amount of additional time required by the UE for PUSCH transmission.

18. A base station (BS) comprising:
- a processor; and
- a non-transitory computer readable storage medium storing instructions that, when executed, cause the processor to:
  - set a first time gap from an end of a physical downlink control channel (PDCCH) to a beginning of a physical downlink shared channel (PDSCH), based on minimum processing capabilities with respect to a PDCCH monitoring span being configured without a high priority channel;
  - set a second time gap from an end of the PDSCH to a beginning of a physical uplink control channel (PUCCH), based on the minimum processing capabilities with respect to the PDCCH monitoring span being configured without the high priority channel;
  - configure the high priority channel and a low priority channel in the PDCCH monitoring span;
  - receive, from a user equipment (UE), at least one parameter indicating a minimum amount of additional time required by the UE for processing the low priority channel based on the PDCCH monitoring span configured with the high priority channel and the low priority channel; and
  - based on the at least one parameter, configure the UE with at least one offset used to increase at least one of the first time gap and the second time gap.

19. A base station (BS) comprising:
- a processor; and
- a non-transitory computer readable storage medium storing instructions that, when executed, cause the processor to:
  - set a time gap from an end of a physical downlink control channel (PDCCH) to a beginning of a physical uplink shared channel (PUSCH), based on a minimum processing capability with respect to a PDCCH monitoring span being configured without a high priority channel;
  - configure the high priority channel and a low priority channel in the PDCCH monitoring span;
  - receive, from a user equipment (UE), a parameter indicating a minimum amount of additional time required by the UE for processing the low priority channel based on the PDCCH monitoring span configured with the high priority channel and the low priority channel; and
  - based on the parameter, configuring the UE with an offset used to increase the time gap.

20. A user equipment (UE) comprising:
- a processor; and
- a non-transitory computer readable storage medium storing instructions that, when executed, cause the processor to:
  - transmit, to a base station (BS), at least one parameter indicating a minimum amount of additional time required by the UE for processing a low priority channel, when the BS configures a high priority channel and the low priority channel in a physical downlink control channel (PDCCH) monitoring span;
  - receive, from the BS, at least one offset that is based on the at least one parameter; and
  - increase at least one of a first time gap and a second time gap based on the at least one offset,
  - wherein the first time gap is set from an end of a PDCCH to a beginning of a physical downlink shared channel (PDSCH) based on minimum processing capabilities with respect to the PDCCH monitoring span being configured without the high priority channel, and the second time gap is set from an end of the PDSCH to a beginning of a physical uplink control channel (PUCCH) based on the minimum processing capabilities with respect to the PDCCH monitoring span being configured without the high priority channel.

21. A user equipment (UE) comprising:
- a processor; and
- a non-transitory computer readable storage medium storing instructions that, when executed, cause the processor to:
  - transmit, to a base station (BS), a parameter indicating a minimum amount of additional time required by the UE for processing a low priority channel, when the BS configures a high priority channel and the low priority channel in a physical downlink control channel (PDCCH) monitoring span;
  - receive, from the BS, an offset that is based on the parameter; and
  - increase a time gap based on the at least one offset,
  - wherein the time gap is set from an end of a PDCCH to a beginning of a physical uplink shared channel (PUSCH) based on a minimum processing capability with respect to the PDCCH monitoring span being configured without the high priority channel.

* * * * *